April 23, 1968  O. G. KOPPIUS  3,379,524
PROCESS FOR PRODUCING CASTABLE ELECTRICAL DISCHARGE
MACHINING ELECTRODE MATERIAL
Filed June 21, 1967
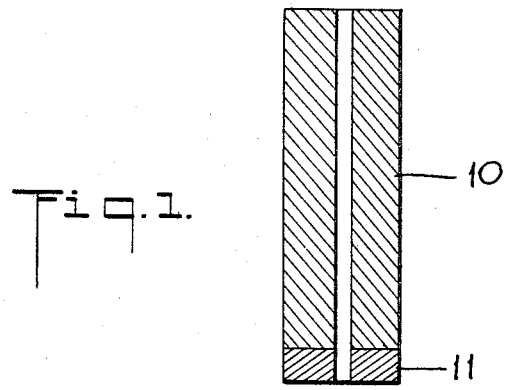
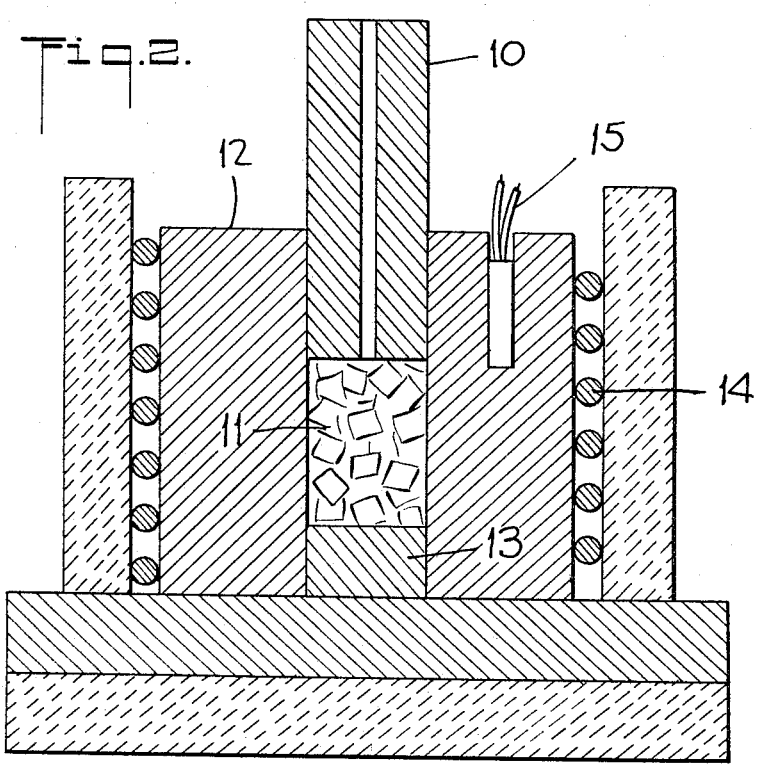
INVENTOR.
OTTO G. KOPPIUS
BY Michael Ebert
ATTORNEY United States Patent Office 3,379,524
Patented Apr. 23, 1968

3,379,524
PROCESS FOR PRODUCING CASTABLE ELECTRICAL DISCHARGE MACHINING ELECTRODE MATERIAL
Otto G. Koppius, Florence, Ky., assignor of eighty-five percent to Kopco Industries, Florence, Ky., a corporation of Kentucky, and fifteen percent to Michael Ebert, New York, N.Y.
Filed June 21, 1967, Ser. No. 647,870
5 Claims. (Cl. 75—213)

ABSTRACT OF THE DISCLOSURE

A castable electrical discharge machining electrode material fabricated by dispersing fine particles of a relatively hard, high melting insoluble element or compound in a fusible alloy to produce a castable alloy which is formed into the desired electrode shape in a heated die.

---

This invention relates generally to electrical discharge machining electrodes and more particularly to a novel technique for fabricating such electrodes.

Electrical Discharge Machining (E.D.M.) is a controlled spark erosion process, with the eroded area assuming a shape complementary to that of the electrode. Of all the parameters relating to the process, the choice of electrode material is often the most important. A complicated die configuration requires that much time and effort be spent in making the electrode tool. In most cases, many identical electrode tools must be made to carry out a successful E.D.M. operation because such tools are subjected to nose and corner wear.

In the past, E.D.M. operators have sought to make a precision die or cavity mold of the electrode tool and then use the mold as a master to form many electrode tools of the same configuration. The usual procedure is to cast the electrode with some fusible material, such as the zinc die cast alloys, babbitt, zinc-tin alloys, etc. These have not proven to be practical in that all of these materials have exhibited very poor E.D.M. wear rates, and most of them undergo a dimensional shrinkage when the fusible material solidifies. Thus, either the original master electrode mold must be corrected to allow for these changes, or the cast electrode must be hot pressed to the final dimensions. For these reasons most E.D.M. operators have not used cast electrodes although the general procedure does have merit. The desideratum is a low temperature castable material with a moderately good E.D.M. wear rate, and with a negligible contraction so that accurate dimensions can be held.

Accordingly the main object of this invention is to provide an E.D.M. material wherein the physical and electrical properties of a fusible alloy are changed by incorporating therein fine particles of an insoluble element or compound which is wetted by the alloy.

The insoluble element or compound in the fusible alloy acts like sand in cement. In metallurgical terms, the fusible alloy is dispersion hardened by the addition of particles of a harder, higher melting element or compound. The higher melting element or compound does not enter into chemical composition with the fusible alloy, but it does come into intimate contact by virtue of the wetting action.

Briefly stated, in fabricating one preferred form of an E.D.M. electrode in accordance with the invention, tungsten is used as the insoluble element and is dispersed in a zinc die cast alloy which can be made to wet the tungsten powder. A combination of one part by weight tungsten powder wetted by two parts of the zinc die cast alloy is formed. This composite constitutes the new E.D.M. castable alloy. The melting range of the zinc alloy is not affected by the presence of tungsten powder since no interchemical combination is found to exist. Further, little or no shrinkage characteristics are observed. Hence, the composite acts as a true two-component system. At a temperature above the melting range of the alloy, i.e. 425° C., the wetted tungsten powder is in suspension within the molten alloy. The molten alloy composite will readily conform to any complex configuration, and when solidified, it reproduces such a configuration. Although this solidified composite makes a good E.D.M. electrode, the method in accordance with the invention of introducing it into an E.D.M. electrode die cavity produces far superior results.

The concentration of tungsten powder in such a composite alloy is rather low. The tungsten occupies approximately one fifth the volume of the alloy. The density of the zinc alloy is 7.13 whereas that of tungsten is 19.3. To obtain a superior E.D.M. electrode one needs to increase the concentration of the tungsten powder, or remove a large fraction of the fusible alloy. Ideally one would like to compact all the tungsten powder together as close as possible, leaving the fusible alloy as a binding agent. Under pressure the molten fusible alloy is subject to all the laws of hydrodynamics; the tungsten particles however are not subject to these laws. They are under hydrostatic pressure but their movement is governed by frictional forces. Hence, under hydrostatic pressure the molten alloy will flow out of a small hole or crack, whereas the tungsten powder will not. Of course, depending on the size of the hole or crack, some tungsten will move out with the molten alloy but this is negligible compared to the amount remaining.

This phenomenon is similar to piling wet sand with a bucket on the seashore. Although some of the sand flows away with the excess water, most of it remains to form a pile. Thus, to form a superior E.D.M. electrode it is necessary to apply pressure to the composite alloy while it is molten and in place in the die configuration which it is expected to reproduce. Further, vents must be provided in the plunger through which the pressure is applied to allow the excess alloy to escape. Finally, it is preferable that the pressure be applied continuously until after the alloy has solidified. In practice a pressure between 1000 and 2000 p.s.i. was found ample.

For a better understanding of the invention, reference is made to the following detailed description to be read in conjunction with the accompanying drawing wherein:

FIG. 1 is a section of an E.D.M. electrode according to the invention, and

FIG. 2 shows the die arrangement for forming the electrode.

The procedure for making a fusible alloy tungsten mixture is as follows:

Step 1.—1000 grams of 5 micron tungsten powder and 2000 grams of zinc die cast alloy are weighed out separately.

Step 2.—The 2000 grams of zinc die cast alloy is placed in an electrically heated cast iron pot. The pot is equipped with a stirrer whose movement insures that all heavy material collected on the sides and bottom of the pot is continuously agitated. The entire unit is placed in a tank which is opened only at the top. The tank is purged with dry argon gas.

Step 3.—The temperature of the cast iron pot (Step 2) is increased to 500° C., at which temperature the zinc alloy is rendered molten. The stirrer of Step 2 is set in motion. The molten zinc alloy will have a dross on the surface which must be removed by carefully skimming. The skimmings are iron-aluminum compounds and oxidation products.

Step 4.—The 1000 grams of tungsten powder weighed out in Step 1 is dumped into the molten zinc alloy formed in Step 3.

Step 5.—The stirring action is continued for about a half hour at which time all of the tungsten particles are coated. The electrical power to the heater is then cut off and the pot is allowed to cool slowly. The stirrer is kept in motion.

Step 6.—Below a temperature of 419° C., the alloy will start to solidify; however with constant stirring, it will break up into small lumps as the alloy turns from a liquid to a mush-like mass. At some point in the solidification process, the stirrer motor will stall due to the heavy load, at which stage the stirring is discontinued. The unit is allowed to cool at room temperature.

Step 7.—The material produced by Step 6 is crushed, screened, and placed in storage.

Steps 1 through 7 is the preferred method of making the castable alloy. The E.DM. performance of a castable alloy so produced is very good, except that it gives a very erratic wear rate due to the nonuniform dispersion of the tungsten particles within the alloy.

The salient feature of the present invention is that superior E.D.M. electrodes can be formed from the alloy made as per Steps 1 through 7 by removing all the excess fusible material and at the same time compacting the tungsten particles together such that the remaining fusible alloy acts only as a binder between the particles. Such a procedure alters the E.D.M. electrode action from one that is predominately zinc to one that is determined by the tungsten, as a consequence of which both wear rate and uniformity of E.D.M. action is markedly improved.

The procedure for forming a castable E.D.M. electrode will now be described. By way of example, the electrode in question is one used for cutting a round hole through a hardened steel die block. Such an electrode could be square, rectangular, or any odd configurtion. It consists of a metal rod through which a small oil feed hole has been drilled to accommodate the E.D.M. dielectric oil flow. The object of the technique to be described is to cast a suitable E.D.M. cutting surface on the end of the round rod. FIGURE 1 is a cross sectional view of the finished electrode 10 with the castable E.D.M. material 11 formed on the cutting end.

FIGURE 2 illustrates the electrode forming die. A steel die block 12 having a hole of the same diameter as the electrode 10 is plugged by the steel insert 13. The die block is heated by an external heater assembly 14. The temperature of the die block is measured by a thermocouple 15. The whole assembly is mounted between the platens of a hydraulic press (not shown) in order to apply pressure on the electrode 10.

To form the E.D.M. electrode the following procedure is used:

Step 8.—A small portion of the castable alloy formed by Steps 1 through 7 is placed in the cavity formed by the plug 13 and the electrode 10. The actual amount is determined by the desired size of the E.D.M. electrode.

Step 9.—The temperature of the die assembly is increased to 425° C. at which value the zinc die casting alloy becomes molten.

Step 10.—The electrode 10 is slowly pushed down until the pressure is about 1000 p.s.i. One will observe during the operation that the excess fusible alloy in the cavity flows up the oil hole.

Step 11.—The pressure is held at 1000 p.s.i. on the electrode and the heat is shut off. The assembly is allowed to cool to room temperature.

Step 12.—The pressure is released and the electrode is pushed out of the die assembly.

Step 13.—The excess fusible alloy which flowed up the oil hole in the electrode is then drilled out, thereby completing the E.D.M. electrode.

The fusible alloy composite thus formed was found to have a density between 11.0 and 12.25 in grams per cc.

The zinc die cast alloys contain zinc as the principle constituent with additions of aluminum, copper, not exceeding 5% and minor amounts of magnesium, lead, cadmium, and tin.

Superior E.D.M. castable electrodes can be made using a fusible alloy of magnesium and copper. The concentration range for the alloy lines within 30 to 85 percent by weight of magnesium with the balance copper. Specifically, 48% by weight magnesium with the balance of copper is ideal, for it has a melting point around 570° C. Except for the higher melting point, the magnesium-copper alloy is equally as good as the zinc die cast alloy, and in some respects it is much better. The low boiling point of zinc tends to make it difficult to work with. The same steps 1 to 13 are used to make the magnesium castable E.D.M. electrodes, the only change being in the pressing temperature which now must be increased about 150° C. to around 570° C.

The more expensive magnesium-silver combination can be used with 50% magnesium by weight and the balance silver. In this case the melting point is around 480° C.

The melting points and boiling points of the principle elements for forming the major constituent of E.D.M. castable alloys are

| Element | Melting Point, ° C. | Boiling Point, ° C. |
|---|---|---|
| Indium | 156 | 2,075 |
| Tin | 232 | 2,270 |
| Bismuth | 271 | 1,627 |
| Thallium | 303 | 1,457 |
| Cadmium | 321 | 767 |
| Lead | 327 | 1,737 |
| Zinc | 419 | 906 |
| Tellurium | 449 | 990 |
| Antimony | 630 | 1,440 |
| Magnesium | 651 | 1,130 |

None of these elements will alloy with tungsten, molybdenum, tantalum or columbium to any degree. The only exception is the formation of columbium-tin compound above 1200° C. ($Nb_3Sn$). For the purpose of this invention compound formation of these elements with the refractory elements can be neglected.

Of the ten elements listed and their combinations, those with a low melting point and a high boiling point were found to wet both tungsten and molybdenum powder with ease. Indium, tin, bismuth, zinc, and magnesium in the order named were found best. The remaining elements wet tungsten with some difficulty. Zinc and magnesium were found to be the most practical major alloy constituent, from the standpoint of price, ease of handling, alloy combinations, etc. Most important, both zinc and magnesium give smooth E.D.M. electrical discharge operation and they form many different fusible alloy combinations with tin, bismuth, antimony, cadmium, copper, and silver.

Tantalum and columbium combinations with the fusible alloys can be made in a vacuum furnace. Effective wetting will occur under this condition.

The presence of ten percent by volume of tungsten powder in copper alloys, magnesium alloys, zinc die cast alloys, etc. serves to increase their strength five fold. Further, such compounds as tungsten carbide, titanium carbide, aluminum oxide, etc. can be added by the same procedure.

A conventional E.D.M. test was made comparing a commercially available electrode material, Mallory 10W3, with the new electrode materials contain zinc and magnesium as the major constituent of the fusible alloy. The following results were obtained for identical machine settings and time.

|  | Mallory 10w³ | Zinc Die Cast Alloy plus tungsten | Magnesium plus tungsten |
|---|---|---|---|
| Length of the E.D.M. electrode before test (in.) | 2.101 | 2.512 | 2.413 |
| Length of the E.D.M. electrode after test (in.) | 2.081 | 2.487 | 2.390 |
| Electrode Material Eroded (in.) | .020 | .025 | .023 |
| Depth of Penetration (in.) | .082 | .075 | .077 |
| Wear Ratio Depth of Penetration Material Eroded (in.) | 4.1 | 3.0 | 3.35 |

Die Material—General Electric 883 Tungsten Carbide.

The wear ratio of the new materials is about a factor of three better than that of the zinc castable alloys under the same conditions of testing.

The shrinkage of zinc die cast alloys does not exceed .001″ per inch. The shrinkage of the same alloy with tungsten as fabricated per this disclosure is less than .0001″ per inch. Evidently the tungsten particles which are in close contact and cemented together by the zinc die cast alloy prevents the shrinkage normally observed. Approximately the same shrinkage value was found for magnesium-copper with tungsten.

While there has been disclosed a preferred technique in accordance with the invention, it will be obvious that many changes may be made therein without departing from the essential spirit of the invention as defined in the annexed claims.

What I claim is:

1. A method of fabricating an electircal discharge machining electrode comprising the steps of:
   (a) dispersing fine particles of a relatively hard insoluble metal having a high melting point in a wettable alloy having a lower melting point to produce a two component mass, said particles being a refractory metal selected from a class consisting of tungsten, molybdenum, tantalum and columbium,
   (b) pulverizing the mass,
   (c) placing a charge of the pulverized mass in a die cavity which is heated to render the alloy component in the charge molten, and
   (d) subjecting the molten charge to pressure by means of a rod having a leakage hole therein to cause the excess of said alloy component to drain from the cavity and thereby increase the concentration of the fine particle component, said die cavity having the desired electrode configuration.

2. A method as set forth in claim 1 wherein said fine particles are tungsten powder.

3. A method as set forth in claim 1 wherein said fusible alloy is formed of zinc with additions of aluminum and copper not exceeding 5% by weight.

4. A method as set forth in claim 1 wherein said fusible alloy is 30 to 85 percent of magnesium, the balance copper by weight.

5. A method as set forth in claim 1 wherein said fusible alloy is about 50% magnesium, the balance silver by weight.

References Cited

UNITED STATES PATENTS 3,320,056   5/1967   Stoops _____ 75—204 X

CARL D. QUARFORTH, *Primary Examiner.*

A. J. STEINER, *Assistant Examiner.*